United States Patent [19]
Gitlin et al.

[11] Patent Number: 5,630,207
[45] Date of Patent: May 13, 1997

[54] METHODS AND APPARATUS FOR BANDWIDTH REDUCTION IN A TWO-WAY PAGING SYSTEM

[75] Inventors: Richard D. Gitlin, Little Silver; Krishan K. Sabnani, Westfield; Thomas Y. C. Woo, Red Bank, all of N.J.

[73] Assignee: Lucent Technologies Inc., Murray Hill, N.J.

[21] Appl. No.: 492,468

[22] Filed: Jun. 19, 1995

[51] Int. Cl.$^6$ ........................................... H04B 7/00
[52] U.S. Cl. .................. 455/54.1; 455/38.4; 455/67.7; 340/311.1; 340/825.44
[58] Field of Search ........................ 455/56.1, 31.1, 455/67.7, 54.1, 38.1, 38.4; 340/311.1, 313, 825.44; 371/37.8; 341/106

[56] References Cited

U.S. PATENT DOCUMENTS

| | | | |
|---|---|---|---|
| 4,612,532 | 9/1986 | Bacon et al. | 341/106 |
| 4,882,579 | 11/1989 | Siwiak . | |
| 5,153,582 | 10/1992 | Davis | 340/311.1 |
| 5,193,214 | 3/1993 | Mardus et al. | 455/54.2 |
| 5,307,399 | 4/1994 | Dai et al. . | |
| 5,335,246 | 8/1994 | Yokev et al. | 455/31.1 |
| 5,406,278 | 4/1995 | Graybill et al. | 341/106 |
| 5,426,422 | 6/1995 | Vanden Heuvel et al. | 340/825.27 |
| 5,430,436 | 7/1995 | Fennell | 340/825.44 |
| 5,450,071 | 9/1995 | DeLuca et al. | 340/825.44 |

FOREIGN PATENT DOCUMENTS

0358527  3/1991  Japan .

*Primary Examiner*—Reinhard J. Eisenzopf
*Assistant Examiner*—Lee Nguyen

[57] ABSTRACT

Method and apparatus for transmitting messages in a two-way paging system are disclosed. Reply codes corresponding to portions of a message to be transmitted by a base station and received by a mobile pager device are computed either at the base station or at the pager according to various embodiments. The reply codes, which are typically shorter and require less bandwidth than the full text to which they correspond, are incorporated by the pager into reply messages when the user of the pager device wishes to refer to portions of the text of the received message in his reply. The present invention advantageously allows the user of a pager device to respond to a received message by transmitting a reply message that incorporates part of the text of the original received message without significantly increasing the bandwidth required to transmit the response.

48 Claims, 4 Drawing Sheets

METHODS AND APPARATUS FOR BANDWIDTH REDUCTION IN A TWO-WAY PAGING SYSTEM

FIELD OF THE INVENTION

The present invention relates generally to telecommunications systems, and, in particular, to a technique for reducing the transmission requirements of a pager device in a two-way paging system.

BACKGROUND OF THE INVENTION

Typical radio paging systems provide simple unidirectional transmission from a fixed location to a specifically addressed portable pager, such that when the transmission is received, the pager device provides an alerting tone, a simple text message, or both. Paging systems provide optimized one-way communication over a large region through a high power transmitter, typically a few kilowatts, that uses high antennas at multiple sites to provide reliable coverage throughout the region. Satellite-based paging systems are also in operation to provide extended service regions. The power requirements of a pager are typically very low because the pager is often simply a receiver with a small annunciator. A pager is, therefore, a small, light weight and relatively low cost device, which can operate for long intervals before its batteries need to be recharged or replaced.

Due to the advantage in size, cost and operating duration offered by pocket-size pagers, attempts have been made to impart limited two-way communication into paging systems, which are optimized for one-way traffic. One known attempt includes the incorporation of an acknowledgement message through reverse transmission links between the individual pagers and the fixed sites. Another known reverse-paging approach includes the use of codes corresponding to a series of messages, which may be tailored to a particular user. When the user wishes to send one of the messages, he activates his pager, types in the code corresponding to the predetermined message and a further code which indicates the destination of the message. A CPU associated with the fixed site receives the signals transmitted by the pager and determines the codes which have been transmitted. The CPU can then send the messages indicated by the codes to the desired destination.

When responding to a page or received message, however, it is often desirable to refer to the text of the original message or a portion thereof. Including the text of the original message in the response by the recipient of the page, however, would typically result in a lengthy reply, thus requiring additional bandwidth which may not be available for use in transmitting a response from the pager. Also, transmitting a lengthy reply typically requires more power than a shorter reply. Furthermore, known existing paging devices do not provide for predetermined codes which the recipient of the original page can use to refer to specified portions of the received message, because the text of the original message is not known by the recipient in advance.

It is, therefore, desirable to provide a two-way paging system that allows the recipient of a message on a paging device to respond by including references to the text of the original message without significantly increasing the bandwidth required to transmit the response.

SUMMARY OF THE INVENTION

The present invention provides for a two-way paging system and paging methods which solve the aforementioned problems. In accordance with the present invention, reply codes corresponding to portions of a message to be transmitted by a base station and received by a mobile pager device are computed either at the base station or at the pager according to various embodiments disclosed below. The reply codes, which are typically shorter and require less bandwidth than the full text to which they correspond, are incorporated by the pager into reply messages when the user of the pager device wishes to refer to portions of the text of the received message in his reply. The present invention thus advantageously allows the user of a pager device to respond to a received message by transmitting a reply message that incorporates or refers to part of the text of the original received message without significantly increasing the bandwidth required to transmit the response.

Other features and advantages of the present invention will be readily apparent by reference to the following detailed description and accompanying drawings.

DETAILED DESCRIPTION

Figure 1:
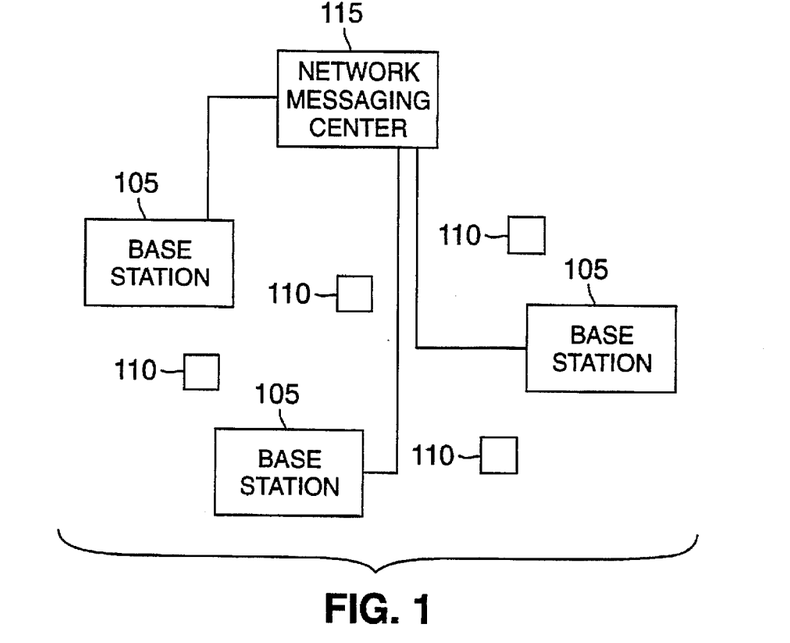
FIG. 1 is a schematic block diagram of an exemplary pager system in which the present invention may be advantageously employed.

As shown in FIG. 1, a pager system 100 in accordance with the present invention preferably comprises one or more base stations 105, which may send and receive messages to and from a network messaging center 115, and at least one mobile remote pager device 110. The system 100 typically will have a large number of pager devices 110. The pager devices can be carried by people or vehicles which are to be paged.

Figure 2:
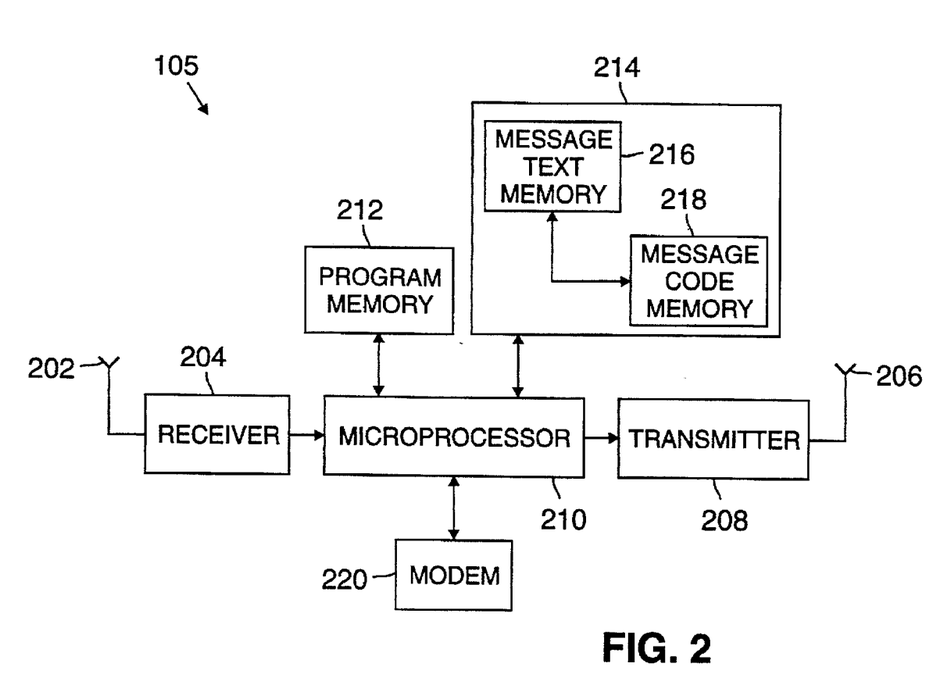
FIG. 2 shows the details of a single exemplary base station according to the principles of the present invention.

FIG. 2 shows the details of a single exemplary base station 105. The base station 105 preferably has a receiving antenna 202 and a receiver 204, as well as a transmitting antenna 206 and a transmitter 208, for receiving and transmitting paging messages, respectively. Although separate receiving and transmitting antennas 202, 206 are shown, a single shared antenna can be used. The base station 105 further includes a general purpose or dedicated microprocessor or other suitable processor 210 which processes messages received by the base station 105 and processes messages for transmission from the base station 105. The processor 210 may be programmed to process messages, as further explained below, according to software stored, for example, in a memory 212 such as a read only memory (ROM). Another memory 214 associated with the processor 210, which may suitably be a random access memory (RAM), stores the text of a message.

In one embodiment of the present invention, the memory 214 may also store codes corresponding to the various components of the message as explained in greater detail below. The memory 214 may conveniently have two sections, a message text memory 216 which stores the text of a message to be transmitted, and a reply code memory 218 which stores the codes corresponding to the various components of the message. Finally, the base station 105 may suitably have a modem 220 for receiving and sending messages to and from a network messaging center, such as the network messaging center 115.

Figure 3:
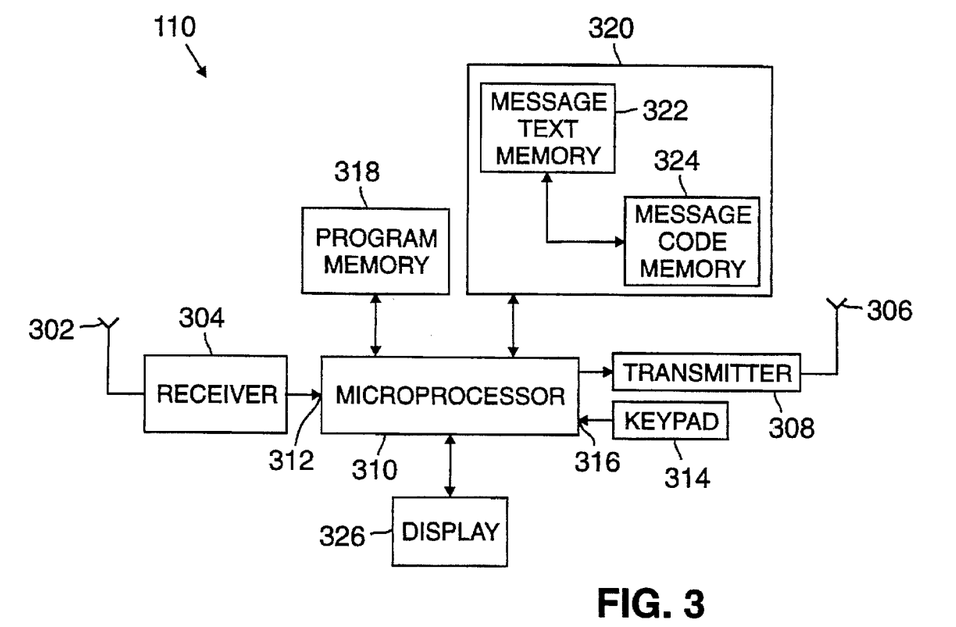
FIG. 3 shows the details of a single exemplary remote pager device according to the principles of the present invention.

FIG. 3 shows the details of a single exemplary remote pager device, such as the pager device 110. The pager device 110 preferably includes a receiving antenna 302 and a receiver 304, as well as a transmitting antenna 306 and a transmitter 308, for receiving and transmitting messages to and from the base station 105, respectively. Although separate receiving and transmitting antennas 302, 306 are shown, a single shared antenna can be used. The pager device 110 also includes a general purpose or dedicated microprocessor or other suitable processor 310. Signals representing a message sent by the base station 105 preferably are received by the processor 310 via an input port 312. The processor 310, which may be suitably programmed, then processes the received signals, and the corresponding message is displayed on a display 326. The display 326 is preferably an LCD or other low-power display and is preferably an integral part of the pager 110. A second input port 316 receives signals from a keypad 314 which is also preferably an integral part of the pager 110. The keypad 314 is activated by a person using the pager 110.

The processor 310 preferably processes the received signals, as further explained below, according to software stored, for example, in a memory 318 such as a read only memory (ROM). Another memory 320, which may suitably be a random access memory (RAM), may store the text of a message sent by the base station 105 to the pager 110. In one embodiment of the present invention, the memory 320 may also store codes corresponding to the various components of the message as explained in greater detail below. The memory 320 may conveniently have two sections, a message text memory 322 which stores the text of a received message, and a reply code memory 324 which stores the codes corresponding to the various components of the received message.

Figure 4:
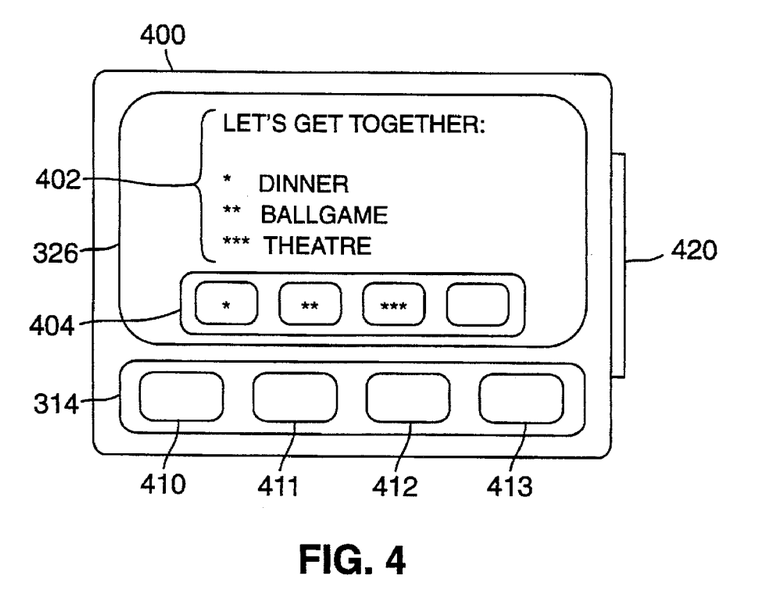
FIG. 4 shows a side view of the exemplary pager.

The entire pager 110 may conveniently be packaged in a miniature case 400, as illustrated in FIG. 4. As shown, the electronic components located inside the pager 110 would not be visible to a user of the pager. A user would, however, be able to view messages, such as a message 402, on the display 326. The user would also see a soft key status line 404 on the display 326. In addition, the user would be able to press keys or buttons 410–413 on the keypad 314, for example, in response to the message 402. Pressing one of the keys 410–413 would cause an appropriate signal to be sent to the processor 310 as explained further below. The keys 410–413 may advantageously be soft keys, whose function at a particular time is determined by the microprocessor 310. The pager also has a power source 420, preferably a low-power source such as a battery, which provides power to the pager components.

Figure 5:
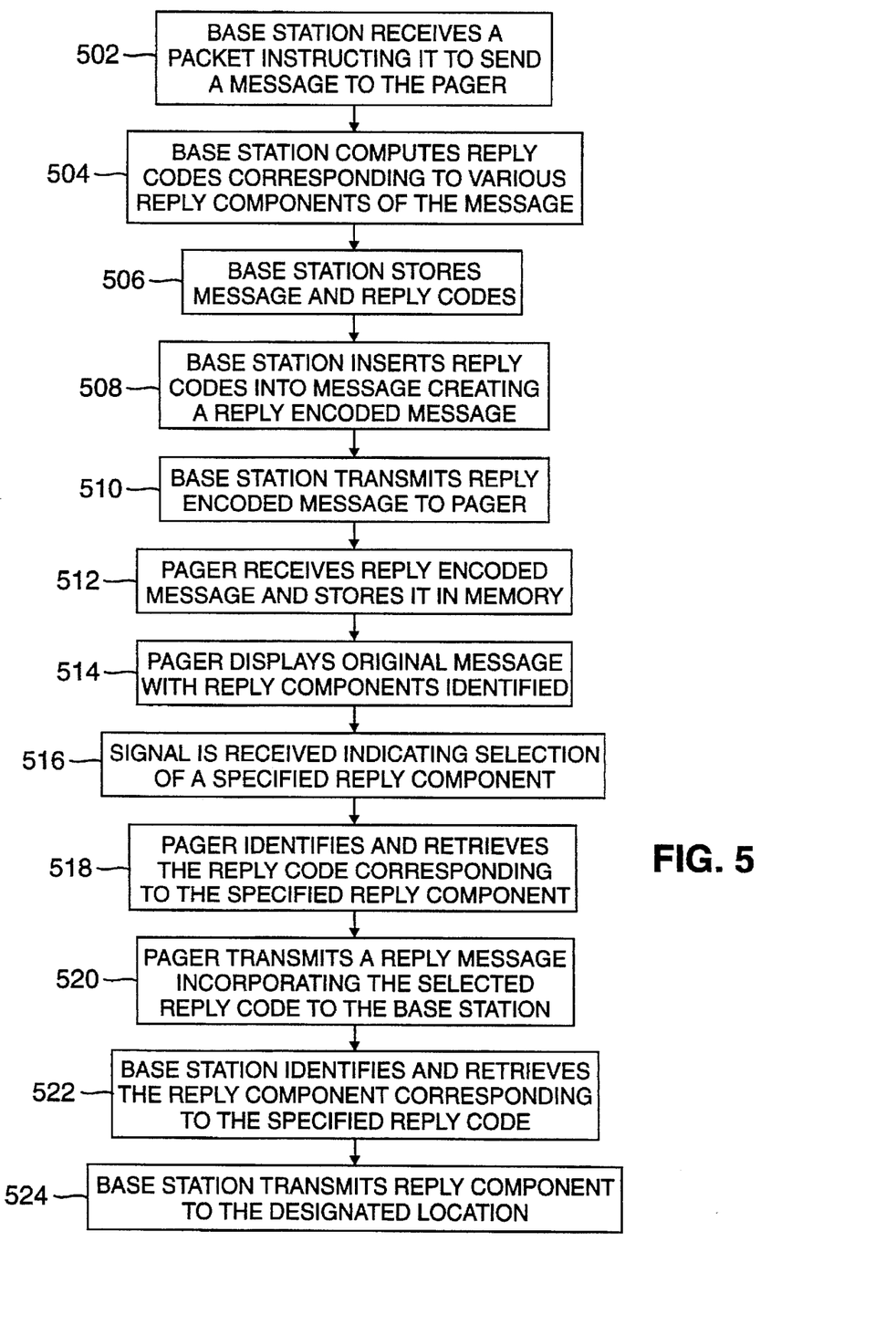
FIG. 5 is a flow chart illustrating the steps of a preferred method according to the principles of the present invention.

FIG. 5 is a flow chart illustrating the steps of a preferred method according to the principles of the present invention. This technique may be referred to as an explicit encoding technique. As shown in step 502, the base station 105 receives a data packet from the network messaging center 115 requesting or instructing it to send a message to the pager 110. The packet may also include an identifier associated with the particular message. Next, as indicated by step 504, the processor 210 executes a routine stored in the program memory 212 and computes reply codes corresponding to various reply components of the message.

The reply components of a message represent portions of the message which the user of the pager 110 may wish to incorporate in his response, if any, to the message. A particular message will have at least one reply component and may have multiple reply components. Consider, for example, the message "LET'S GET TOGETHER: DINNER BALLGAME THEATRE." A recipient of this message may wish to refer to one of the components of the message, such as "DINNER", "BALLGAME" or "THEATRE". The processor 210 would thus compute reply codes corresponding, for example, to the reply components "DINNER", "BALLGAME" and "THEATRE".

The computation of reply codes may be performed according to any one of several techniques, and the following list is intended to be exemplary only. First, a sequential labeling technique, whereby the first reply component is designated by "1" or "A", the second reply component is designated by "2" or "B", and so on, may be employed. For example, the base station 105 may have a counter which maintains a variable initialized to "1" and which is incremented by "1" for each additional reply component. Alternatively, a checksum technique may be used whereby each reply component is encoded using its binary checksum, obtained, for example, by performing the exclusive-or function for all of its component characters. Finally, a hash technique may be used whereby each reply component of the message is encoded with its hash value according to a specified hash function, such as the MD5 hash algorithm, described in "The MD5 Message-Digest Algorithm" by R. Rivest, MIT Laboratory for Computer Science and RSA Data Security, Inc., April, 1992, which is incorporated by reference herein. These encoding techniques may be implemented either in software or in hardware. Also, any of the explicit encoding techniques listed above may be used, and as long as the pager can identify the reply codes based upon the format of the reply-encoded message, it need not know the particular encoding technique used.

Whichever technique is used for obtaining the reply codes, the base station 105 stores the message and the reply codes, as indicated by step 506. The original message may be stored in the message text memory 216, and the reply codes may be stored, for example, in the reply code memory 218, such that the base station 105 retains sufficient information indicating the correspondence between the reply components of the message and the reply codes. The identification of the intended recipient of the message and any message identifier would also be stored in the memory 214. Next, as shown in step 508, the processor 210 inserts the reply codes into the appropriate positions in the original message, thereby creating a reply-encoded message. Specifically, each reply code would be inserted into the original message according to a predetermined format, such as immediately before or immediately following the corresponding reply component of the original message.

Finally, as indicated by step 510, the base station 105 transmits the reply-encoded message to the pager 110, preferably according to a predetermined formatting convention. In particular, the reply message should preferably be formatted so that the reply codes are readily identifiable as such by the pager 110. An identification of the intended recipient of the reply-encoded message also may be included in the reply-encoded message. Similarly, if a message identifier was received by the base station, it also may be included as part of the reply-encoded message transmitted to the pager 110.

Once the pager 110 receives the reply-encoded message, it stores the received reply-encoded message in the memory 320, as shown by step 512. The text of the original message may be stored in the message text memory 322, and the corresponding reply codes may be stored, for example, in the reply code memory 324. Alternatively, the entire reply-encoded message may be stored in a single section of the memory 320. In any event, as illustrated by step 514, the processor 310 extracts the original message, identifies the reply components of the message, and displays the original message on the display 326. The original message may be extracted and the reply components identified based upon the predetermined format known to both the base station 105 and the pager 110.

When the message is displayed, identification codes identifying the reply components of the message will also appear on the display. The identification codes may appear, for example, immediately before or immediately following the various reply components appearing on the display 326. These identification codes are for local use only and correspond to information appearing on the soft key status line 404. The soft key status line 404 indicates to the user the correspondence between a particular one of the soft keys 410–413 and a portion of the message appearing on the display 326.

With reference to FIG. 4, for example, the display 326 shows the message 402 "LET'S GET TOGETHER: DINNER BALLGAME THEATRE." Identification codes "*", "" and "*" appear on the display 326 as well and serve to identify the reply components "DINNER", "BALLGAME" and "THEATRE", respectively, with respect to this particular message. The identification codes also appear in the soft key status line 404 of the display 326, so as to indicate that the soft key 410 corresponds to the reply component "DINNER", the soft key 411 corresponds to the reply component "BALLGAME", and the soft key 412 corresponds to the reply component "THEATRE". It should be noted that the identification codes "*", "" and "*" are exemplary only, and other identification codes may be used.

In general, the soft key status line 404 indicates the function of each soft key 401–413 at any given time. These functions are determined by the appropriately programmed processor 310. In addition to allowing a user to select one or more reply codes to be included in a reply message, pressing the soft keys allows a user to instruct the pager 110 to perform or execute other functions as well. These functions may include, among others, sending a reply message, scrolling through a displayed message, and displaying the identification codes for the portion of the message displayed on the display 326. Thus, for example, if the original message is too long for the entire message to be displayed at one time or if there are numerous reply components, then it may be necessary for the user to scroll through the message by pressing the appropriate soft key. When a component of the message which the user wishes to incorporate in a reply message appears on the display 326, the user would press the appropriate soft key requesting that the identification codes corresponding to any reply components in the displayed portion of the message also be displayed. The identification codes would appear in the display 326 and on the soft key status line 404 indicating which soft key corresponds to a particular reply component. The user would then press the soft key corresponding to the selected reply component.

When a user presses one of the soft keys 410–413 on the keypad 314, a signal is sent and received by the processor 310 via the input port 316. The processor 310 would then perform or execute the function indicated by the particular soft key at that time. With respect to FIG. 4, for example, if the user selected the reply component "DINNER" by pressing the soft key 410, then, as shown by step 516, a signal, such as an electronic signal, would be sent and received by the processor 310, indicating the selection of the specified reply component. Next, as indicated by step 518, the processor 310 identifies and retrieves the reply code corresponding to the specified reply component in response to the received signal. The processor 310 may retrieve the appropriate reply code by accessing the memory 320 where the reply-encoded message was stored. Finally, as shown in step 520, the pager 110 transmits a reply message incorporating the retrieved reply code to the base station 105. The reply message may be transmitted automatically after retrieval of the reply code or, alternatively, in response to the user's pressing the appropriate soft key indicating that the reply message should be sent. As indicated above, the pager 110 preferably uses a relatively low-power supply, and thus messages transmitted by the pager 110 are transmitted at a relatively low transmission rate. In particular, the message transmission rate on the uplink or return channel from the pager 110 to the base station 105 is preferably in the range of $1/10$th to $1/100$th the rate on the downlink or forward channel from the base station 105 to the pager 110. The reply message should preferably be formatted so that reply codes are readily identifiable as such by the base station 105. The reply message may also include an identification of the designated recipient of the message and the message identifier according to a predetermined format.

Upon receiving the reply message, the base station 105 identifies and retrieves the reply component corresponding to the reply code incorporated as part of the reply message, as indicated by step 522. The base station 105 may retrieve the appropriate reply component by accessing the memory 214 in which the original message and associated reply codes are stored. The reply component, which was part of the original message sent to the pager 110, may then be inserted into the reply message in place of the reply code, and the entire reply message, with the inserted reply component, may be transmitted to the designated recipient, as shown in step 524.

Figure 6:
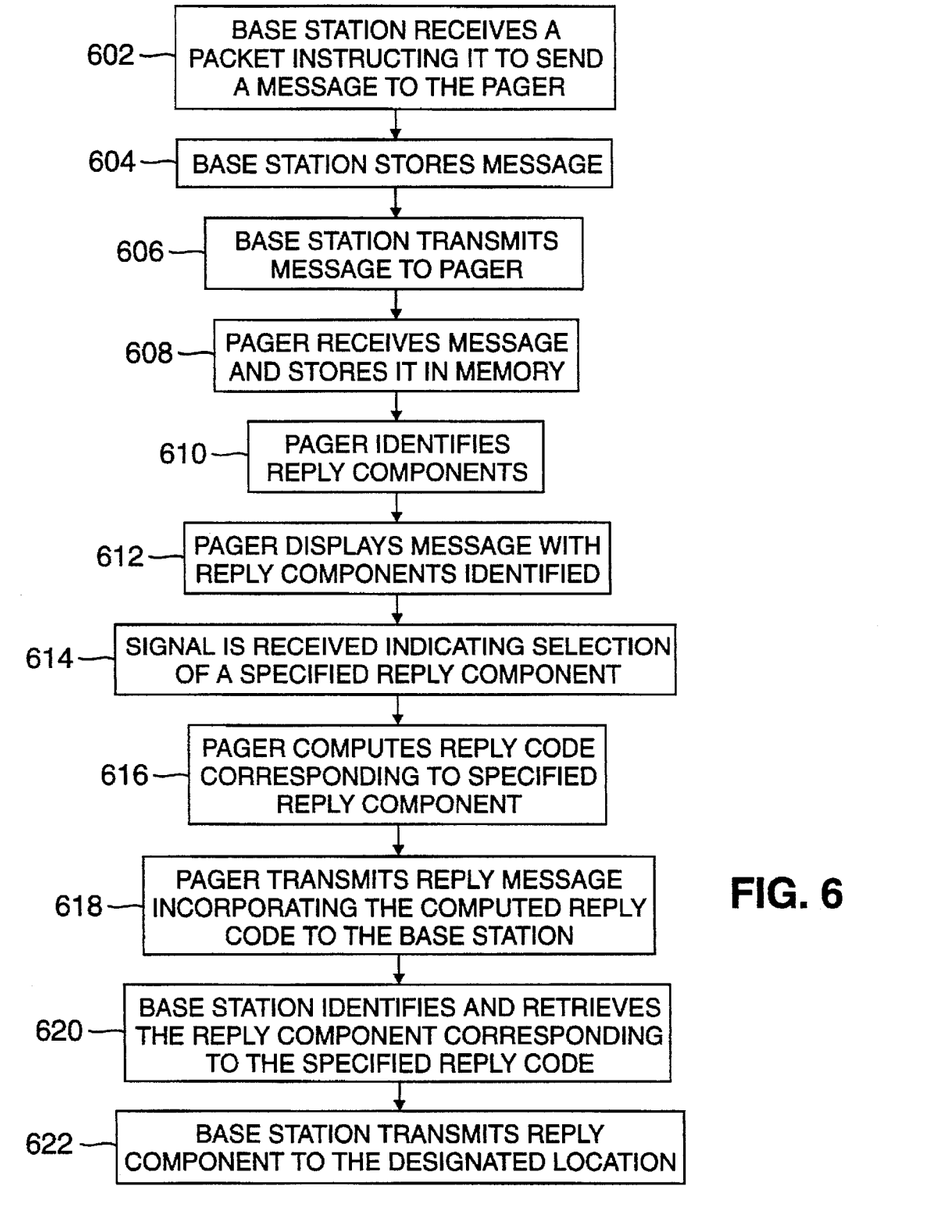
FIG. 6 is a flow chart illustrating the steps of a second embodiment of the method according to the principles of the present invention.

FIG. 6 is a flow chart illustrating the steps of a second embodiment of the method according to the principles of the present invention. This technique may be referred to as an implicit encoding technique. As shown in step 602, the base station 105 receives a data packet from the network messaging center 115 requesting or instructing it to send a message to the pager 110. The packet may also include an identifier associated with the particular message. Next, as indicated by step 604, the base station 105 stores the message, as well as the designated recipient and any message identifier, in the memory 214. In step 606, the base station 105 then sends the message with the message identifier to the pager 110, preferably according to a predetermined formatting convention such that portions of the message which may serve as reply components are identifiable by the pager 110.

Upon receiving the message, the pager 110 stores it in the memory 320, as indicated by step 608. Next, as shown by step 610, the pager 610 identifies the reply components of the received message based upon the predetermined formatting convention. As indicated by step 612, the pager 110 then displays the message on the display 326 with the reply components identified by identification codes in the same manner as described above with respect to FIG. 4. Also, as explained above, the user may scroll through the message and, if he wishes, select a reply component to be included in a reply message by pressing the appropriate soft key on the keypad 314.

Once the user presses one of the soft keys corresponding to the selected reply component, a signal is sent and received via the port 316 by the processor 310 as indicated by step 614. Then, as shown in step 616, the pager 110 computes a reply code corresponding to the selected reply component. Specifically, the processor 310 preferably may compute the reply code according to appropriate software code stored in the memory 318.

In the implicit encoding technique, the reply codes are computed according to any one of several techniques, and the following list is intended to be exemplary only. In general, any convention that is based upon the structure of the received message may be used. For example, a character-based addressing method can be used, whereby a message is interpreted as a character stream, and a reply component of the message is encoded by identifying the positions of the beginning and end characters of the reply component, respectively. Alternatively, a word-based addressing method may be used, whereby a message is interpreted as a sequence of words separated by spaces, and a reply component is encoded by identifying the positions of the beginning and end words of the reply component, respectively. In yet another embodiment, a line-based addressing method may be used, whereby a reply code identifies a reply component according to the line and position of the beginning and end of the reply component, respectively. Finally, a screen-based addressing method may be used, whereby the display or screen coordinates of the beginning and end positions of the reply component are used to encode the reply component. While any of these encoding techniques may be used in the implicit encoding technique, the particular technique employed should be known or communicated to both the base station 105 and the pager 110. Thus, for example, the technique may be predetermined for all communications between the base station 105 and the pager 110, or a method identifier indicating which technique is being used to obtain the reply codes may be included as part of the reply message. Of course, it is to be understood that when reply codes are based upon the structure of the original message, both the pager 110 and the base station 105 use a common reference point for encoding and decoding the reply codes.

As shown in step 618, the pager 110 transmits a reply message incorporating the computed reply code to the base station 105. The reply message may be transmitted automatically after computation of the reply code or, alternatively, in response to the user's pressing the appropriate soft key indicating that the reply message should be sent. As in the explicit encoding technique, messages transmitted by the pager 110 are transmitted at a relatively low transmission rate. In particular, the message transmission rate on the uplink or return channel from the pager 110 to the base station 105 is preferably in the range of 1/10th to 1/100th the rate on the downlink or forward channel from the base station 105 to the pager 110. The reply message should preferably be formatted so that reply codes are readily identifiable as such by the base station 105. The reply message may also include an identification of the intended recipient and the message identifier according to a predetermined format.

As shown by step 620, once the base station 105 receives the reply message, it identifies and retrieves the reply component corresponding to the specified reply code incorporated as part of the reply message. The processor 210 may retrieve the appropriate reply component by accessing the memory 214 in which the original message is stored and by determining which component of the original message the reply code refers to. The reply component may then be inserted into the reply message in place of the reply code, and the entire reply message, with the inserted reply component, may be transmitted to the designated location, as shown in step 622.

In both the explicit and implicit reply encoding techniques of the present invention, reply codes of several bytes in length are typically sufficient for most applications. A reply message incorporating a reply code in place of the full text or reply component to which it corresponds will, therefore, typically be shorter and require less bandwidth than a reply message incorporating the full text of the reply component. Thus, the present invention advantageously allows the user of a pager device to respond to a received message by transmitting a reply message that incorporates part of the text of the original received message without significantly increasing the bandwidth required to transmit the response. Also, the power consumption of the pager will typically be reduced by use of the reply codes.

The implicit reply encoding technique is additionally advantageous in that no pre-computation is required at the base station before a message is transmitted to the pager. A message may be delivered to the pager without undue delay caused by additional pre-processing.

On the other hand, the explicit reply encoding technique, while requiring the computation of the reply codes prior to transmitting the message, is also advantageous because it keeps the processing that occurs at the pager relatively simple. Specifically, in the explicit technique, the pager need only retrieve the reply code corresponding to the reply component selected by the user. The explicit technique thus takes advantage of the asymmetrical design of the two-way paging system by placing most of the processing and transmission requirements in the base station, thereby reducing the computational complexity and the message complexity of the response from the pager device.

In addition, the explicit reply encoding technique is generally more error-tolerant. Slight perturbation of an encoding does not usually result in another valid reply code because the encodings are unrelated to one another. Thus, for example, where the hash method of computing the reply codes is used, the hash values contained in a reply message must belong to the list of valid hash values transmitted in the original reply-encoded message. Otherwise, the reply will be deemed invalid. The explicit technique of reply encoding thus provides error detection in addition to any underlying error control mechanism in the paging system.

Although the present invention has been described with reference to specific embodiments, it will be appreciated that other arrangements within the spirit and scope of the present invention will be readily apparent to persons of ordinary skill in the art. The present invention is, therefore, limited only by the appended claims.

We claim:

1. A two-way paging system comprising:
   a base station comprising:
   (a) a receiver;
   (b) a transmitter; and
   (c) a processor programmed to analyze an original message lacking codes to identify portions of the original message as reply components and to compute from the original message reply codes corresponding to respective reply components of the original message and to transmit a reply-encoded message incorporating the original message and the reply codes; and
   at least one pager device comprising:

(a) a receiver for receiving the reply-encoded message;
(b) a transmitter;
(c) a display;
(d) a keypad; and
(e) a processor programmed to drive the display to display the original message and to display identification codes identifying the reply components of the original message adjacent the reply components, and programmed to respond to a signal generated by pressing a key on the keypad, wherein pressing the key indicates a selection of one of the reply components, and wherein the pager processor responds by identifying the reply code corresponding to the selected one of the reply components and by transmitting a reply message incorporating the reply code corresponding to the selected one of the reply components.

2. The system of claim 1 wherein the base station processor is programmed to compute the reply codes according to a sequential labeling technique.

3. The system of claim 1 wherein the base station processor is programmed to compute the reply codes using binary checksums of the reply components.

4. The system of claim 1 wherein the base station processor is programmed to compute the reply codes according to hash values of the reply components.

5. The system of claim 1 wherein the base station processor is further programmed to identify the selected one of the reply components upon receiving the reply message.

6. The system of claim 5 wherein the base station processor is further programmed to insert the selected one of the reply components into the reply message in place of the reply code.

7. The system of claim 1 wherein the pager transmitter transmits the reply message at a transmission rate in the range of 1/10th to 1/100th the rate at which the reply-encoded message is transmitted.

8. The system of claim 1 wherein transmitting the reply code requires less bandwidth than transmitting the corresponding selected one of the reply components.

9. A pager device for use in a two-way paging system comprising:
a receiver for receiving a reply-encoded message comprising (a) an original message having reply components and (b) reply codes corresponding to the respective reply components;
a transmitter;
a display;
a keypad comprising a plurality of soft keys and a key for scrolling the display; and
a processor programmed to drive the display to display the original message, to display identification codes identifying the reply components of the message adjacent the reply components, and to display a soft key status line on the display for indicating the correspondence between the plurality of soft keys and the reply components, the processor changing said correspondence as necessary as the display is scrolled in response to activation of the key for scrolling the display, and programmed to respond to a signal generated by pressing a particular soft key on the keypad, wherein pressing said soft key indicates a selection of one of the reply components, and wherein the processor responds by identifying the reply code corresponding to the selected one of the reply components and by transmitting a reply message incorporating the reply code corresponding to the selected one of the reply components.

10. The pager device of claim 9 wherein the transmitter transmits the reply message at a transmission rate in the range of 1/10th to 1/100th the rate at which the reply-encoded message is transmitted.

11. The pager of claim 9 wherein transmitting the reply code requires less bandwidth than transmitting the corresponding selected one of the reply components.

12. A two-way paging system comprising: a base station for transmitting an original message lacking codes to identify portions of the original message as reply components; and
at least one pager device comprising:
(a) a receiver for receiving said original message transmitted from the base station;
(b) a transmitter;
(c) a display;
(d) a keypad; and
(e) a processor programmed to drive the display to display the original message, to analyze said original message and to identify the reply components, and to display identification codes identifying the reply components adjacent the reply components, and wherein the processor is further programmed to respond to a signal generated by pressing a key on the keypad, wherein pressing the key indicates a selection of one of the reply components, and wherein the processor responds by computing a reply code corresponding to the selected one of the reply components and by transmitting a reply message incorporating the reply code corresponding to the selected one of the reply components.

13. The system of claim 12 wherein the processor is programmed to compute the reply code based upon the structure of the original message.

14. The system of claim 13 wherein the processor is programmed to compute the reply code based upon a character-based addressing convention.

15. The system of claim 13 wherein the processor is programmed to compute the reply code based upon a word-based addressing convention.

16. The system of claim 13 wherein the processor is programmed to compute the reply code based upon a line-based addressing convention.

17. The system of claim 13 wherein the processor is programmed to compute the reply code based upon a screen-based addressing convention.

18. The system of claim 13 wherein the base station comprises a receiver, a transmitter and a processor, and wherein the base station processor is programmed to identify the selected one of the reply components upon receiving the reply message.

19. The system of claim 18 wherein the base station processor is further programmed to insert the selected one of the reply components into the reply message in place of the reply code.

20. The system of claim 13 wherein the transmitter transmits the reply message at a transmission rate in the range of 1/10th to 1/100th the rate at which the original message is transmitted.

21. The system of claim 13 wherein transmitting the reply code requires less bandwidth than transmitting the corresponding selected one of the reply components.

22. A pager device for use in a two-way paging system comprising:
a receiver for receiving an original message lacking codes to identify portions of the original message as reply components;

a transmitter;

a display;

a keypad; and a processor programmed to analyze said original message and to identify the reply components to drive the display to display the original message and to display identification codes identifying the reply components adjacent the reply components, and wherein the processor is further programmed to respond to a signal generated by pressing a key on the keypad, wherein pressing the key indicates a selection of one of the reply components, and wherein the processor responds by computing a reply code corresponding to the selected one of the reply components and by transmitting a reply message incorporating the reply code corresponding to the selected one of the reply components.

23. The pager device of claim 22 wherein the processor is programmed to compute the reply code based upon the structure of the original message.

24. The pager device of claim 23 wherein the processor is programmed to compute the reply code based upon a character-based addressing convention.

25. The pager device of claim 23 wherein the processor is programmed to compute the reply code based upon a word-based addressing convention.

26. The pager device of claim 23 wherein the processor is programmed to compute the reply code based upon a line-based addressing convention.

27. The pager device of claim 23 wherein the processor is programmed to compute the reply code based upon a screen-based addressing convention.

28. The pager device of claim 23 wherein the transmitter transmits the reply message at a transmission rate in the range of 1/10th to 1/100th the rate at which the original message is transmitted.

29. The pager device of claim 23 wherein the keypad comprises a plurality of soft keys and wherein the display comprises a soft key status line for indicating a correspondence between the plurality of soft keys and the reply components.

30. The pager device of claim 23 wherein transmitting the reply code requires less bandwidth than transmitting the corresponding selected reply component.

31. A method of transmitting a message in a two-way paging system comprising the steps of:

receiving a request to transmit an original message lacking codes to identify portions of the original message as reply components to a pager;

utilizing a processor to compute automatically reply codes from an analysis of the original message corresponding to the respective reply components;

transmitting a reply-encoded message incorporating the original message and the reply codes to the pager;

displaying on the pager the original message and identification codes identifying the reply components of the original message;

identifying the reply code corresponding to a specified one of the reply components in response to a signal generated by a user of the pager pressing a key wherein pressing the key corresponds to a selection of the specified one of the reply components; and transmitting from the pager a reply message incorporating the reply code corresponding to the specified one of the reply components.

32. The method of claim 31 wherein the step of computing comprises the step of computing the reply codes according to a sequential labeling technique.

33. The method of claim 31 wherein the step of computing comprises the step of computing the reply codes using binary checksums of the reply components.

34. The method of claim 31 wherein the step of computing comprises the step of computing the reply codes according to hash values of the reply components.

35. The method of claim 31 further comprising the step of identifying the selected one of the reply components in response to receiving the reply message.

36. The method of claim 35 further comprising the step of inserting the selected one of the reply components into the reply message in place of the reply code.

37. The method of claim 31 wherein the reply message is transmitted at a transmission rate in the range of 1/10th to 1/100th the rate at which the reply-encoded message is transmitted.

38. The method of claim 31 wherein the step of displaying further comprises the step of displaying a soft key status line indicating a correspondence between the key and the specified one of the reply components.

39. The method of claim 31 wherein the step of transmitting a reply code requires less bandwidth than transmitting the corresponding selected reply component.

40. A method of transmitting a message in a two-way paging system comprising the steps of:

transmitting an original message lacking codes to identify portions of the original message as reply components to a pager;

analyzing the original message at the pager to identify the reply components;

displaying on the pager the original message and identification codes identifying the reply components of the original message;

computing from the original message a reply code corresponding to a specified one of the reply components in response to a signal generated by a user of the pager pressing a key wherein pressing the key corresponds to a selection of the specified one of the reply components; and transmitting from the pager a reply message incorporating the reply code corresponding to the specified one of the reply components.

41. The method of claim 40 wherein the step of computing comprises the step of computing the reply code based upon the structure of the original message.

42. The method of claim 41 wherein the step of computing comprises the step of computing the reply code based upon a character-based addressing convention.

43. The method of claim 41 wherein the step of computing comprises the step of computing the reply code based upon a word-based addressing convention.

44. The method of claim 41 wherein the step of computing comprises the step of computing the reply code based upon a line-based addressing convention.

45. The method of claim 41 wherein the step of computing comprises the step of computing the reply code based upon a screen-based addressing convention.

46. The method of claim 41 wherein the reply message is transmitted at a transmission rate in the range of 1/10th to 1/100th the rate at which the original message is transmitted.

47. The method of claim 41 wherein the step of displaying further comprises the step of displaying a soft key status line indicating a correspondence between the key and the specified one of the reply components.

48. The method of claim 41 wherein the step of transmitting a reply code requires less bandwidth than transmitting the corresponding selected reply component.

* * * * *